United States Patent [19]

Friedrich

[11] Patent Number: 4,776,219
[45] Date of Patent: Oct. 11, 1988

[54] PRESSURE TRANSDUCER

[76] Inventor: Jaromir Friedrich, 3219/97 St., Edmonton, Alta., Canada, T6N 1B7

[21] Appl. No.: 34,833

[22] Filed: Apr. 6, 1987

[51] Int. Cl.$^4$ .......................... G01L 7/08; G01L 9/04
[52] U.S. Cl. ........................................... 73/726; 338/4
[58] Field of Search ................ 73/706, 715, 716, 717, 73/718, 719, 720, 721, 723, 724, 725, 726, 727, 756; 338/4, 42

[56] References Cited

U.S. PATENT DOCUMENTS

| | | | |
|---|---|---|---|
| 3,240,065 | 3/1966 | Taber | 73/407 |
| 3,343,420 | 9/1967 | Kondo et al. | 73/398 |
| 3,484,732 | 12/1969 | Postma | 338/4 |
| 3,559,488 | 2/1971 | Weaver | 73/398 |
| 3,950,996 | 4/1976 | Lewis | 73/407 |
| 4,058,788 | 11/1977 | Andrews et al. | 338/42 |
| 4,135,408 | 1/1979 | DiGiovanni | 73/721 |
| 4,686,764 | 8/1987 | Adams | 73/706 |

FOREIGN PATENT DOCUMENTS

0030035  2/1984  Japan .................................... 73/720

*Primary Examiner*—Donald O. Woodiel
*Attorney, Agent, or Firm*—Lawrence M. Nawrocki

[57] ABSTRACT

A pressure transducer is provided, in a preferred embodiment, with a pair of diaphragms (29, 28), each with a strain gauge, and with a rubber-like intermediate layer (33) therebetween. The layer (33) supports the first diaphragm (29) without interfering with its flexing up to a point where the layer (33) becomes non-resilient and transmits further flexing of the first diaphragm to the second diaphragm (28). The diameter of each diaphragm has to be about 2.75-3.75 times greater than that of its central flexing portion forming the bottom of a cavity (30) which, in the shown embodiment, is conical. The overall thickness of the diaphragm is preferably about 5 times greater than the thickness of the flexing portion to eliminate or at least substantially reduce the influence of parasitic stresses introduced by clamping forces holding the diaphragm in place. This, in turn, will improve the accuracy of the transduced values which will stay generally linear as long as the deflection of the flexing portion is within about 25% of the thickness thereof. The invention presents the advance of simple structure affording a wide measuring range and an improved accuracy of measurement.

24 Claims, 2 Drawing Sheets

PRESSURE TRANSDUCER

The present invention relates to the art of pressure transducers and in particular to pressure transducers utilizing strain gauges fashioned into a full four-arm Wheatstone bridge bonded to a sensing element. When the sensing element is caused to deflect by pressure applied to it, the strain gauge is stressed which gives rise to changes in electrical resistance producing a change in electrical output signal that corresponds to the pressure change. The strain gauges are usually installed by bonding directly to the surface of the sensing element. Signal transmission from the transducer is carried out by electrical wiring.

There are many known pressure transducers of the above type. For instance, U.S. Pat. No. 3,950,996 issued Apr. 20, 1976 to Lewis shows the principle of two membranes interconnected with each other and used in a tandem fashion. The pressure of the medium to be measured acts on dual diaphragms, both made from flexible materials. The movement of one diaphragm is limited in one direction of a shaft axial movement, while the movement of the other flexible diaphragm is limited in the opposite direction of the shaft axial movement. The overall arrangement is complex in structure and may give rise to difficulties in maintaining linear increase or decrease of the values transmitted from the stress gauges secured to a loop spring operatively connected with the axially displaceable shaft. Another known arrangement is disclosed in U.S. Pat. No. 4,058,788 issued Nov. 15, 1977 to Andrews et al. shows an arrangement including a first and a second pressure sensitive diaphragm assembly flexing in unison. A cantilever beam bearing at least one strain gauge senses the deflection. As in the first prior art reference, the arrangement is complex in structure and must be difficult to calibrate for a relatively high accuracy. Besides, the diaphragms used in the device are subject to vibrations, a source of potential difficulties for all kinds of mechanical switches.

U.S. Pat. No. 3,484,732 issued Dec. 16, 1969 to Postma discloses a pressure transducer having a diaphragm for converting fluid pressure to a force transmitted to a low range sensor protected by a stop from becoming overloaded and damaged. A subsequently operated high range sensor absorbs forces in excess of the overload force. Both sensors incorporate strain gauges. The device is of a complex structure and utilizes a great number of mechanical transmission means which are likely to make it very difficult to accurately gauge pressure of a medium within a relatively wide range. Generally the same applies to the differential pressure transducer disclosed in U.S. Pat. No. 3,240,065 issued Mar. 15, 1966 to R. F. Taber. It is also known to utilize for the purpose of deflecting a member bearing a stress gauge series of bellows. Bellows, however, are disadvantageous in many practical applications not only due to the complexity of their shape but mainly due to the fact that they are subject to damage due to mechanical impacts caused by vibrations or the like.

It is an object of the present invention to further advance the art of pressure transducers of the above type by simplifying the structure of the pressure transducer while at the same time increasing the pressure range within which the transducer is capable to operate. For example, the transducer according to one actual embodiment of the present invention is designed for the range of pressures from 10 inches Hg. vacuum to 4,000 P.S.I. The pressure range can be increased to 10,000 P.S.I. or more if required.

Another object of the invention is to provide a pressure switch of the above type for operating within a wide range of temperatures, for instance from approximately −55° F. to about 800° F. A further object of the invention is to provide a pressure switch capable not only to sense a wide range of pressures but also to do so with a relatively high accuracy.

In general terms, the present invention provides a pressure transducer including, in combination: a housing portion provided with an opening at an outer end thereof; a disc-shaped first diaphragm fixedly mounted in said housing and having an outer surface portion exposed through said opening; said first diaphragm having an inner surface portion provided with a first strain gauge; a support plate member secured to said housing portion; a layer of a resilient, rubber-like material sandwiched between the first diaphragm and the support plate member for transmitting the flexing of the first diaphragm, due to pressures at said opening, from said first diaphragm to said support plate member; and first transducing means for transmitting a signal produced by the first strain gauge.

Preferably, the support plate member is a circular, disc-shaped second diaphragm identical in shape and size to the first diaphragm and having an outer surface portion turned towards the inner surface portion of said first diaphragm. It also has an opposed, inner surface portion provided with a second strain gauge, the transducer further comprising second transducing means for transducing a signal produced by the second strain gauge. The resilient, rubber-like material is preferably injected into a cavity in the second diaphragm, the cavity preferably having the shape of the trapezoidal or rectangular cross-sectional configuration. The trapezoidal or conical shape is divergent in the direction towards the first diaphragm.

Further features and advantages of the present invention will become apparent from the following description of an example of a preferred embodiment of the present invention, with reference to the accompanying drawings, wherein.

Figure 1:
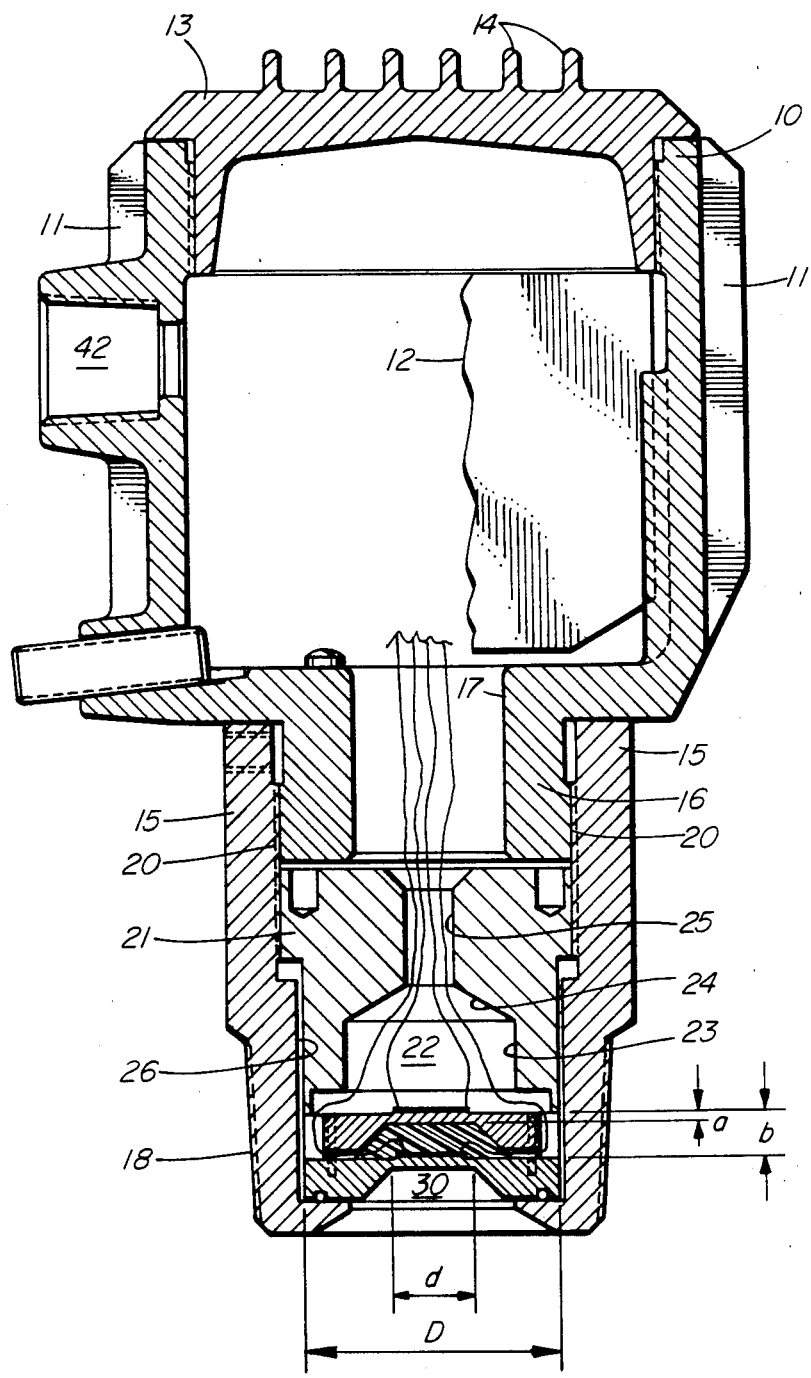
FIG. 1 is a simplified cross-sectional view of a preferred embodiment of a pressure transducer of the invention.
Figure 2:
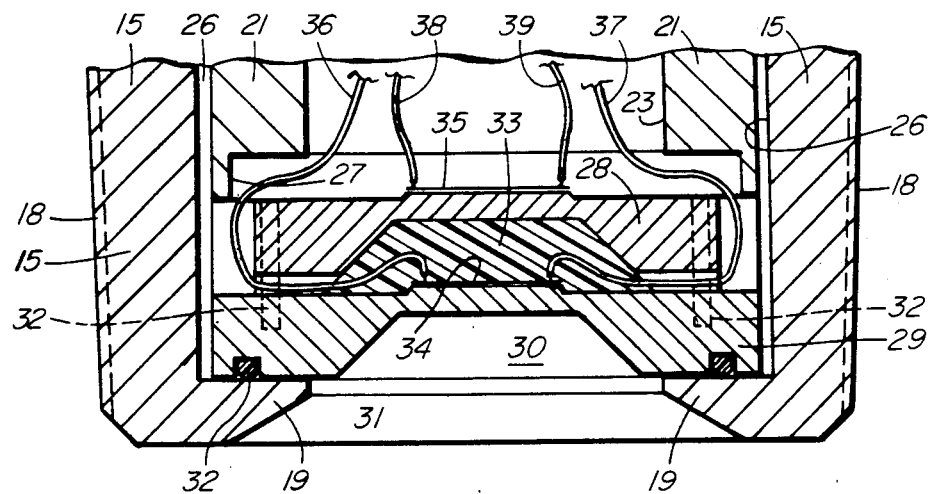
FIG. 2 is a enlarged cross-sectional view of the lower part of the transducer of FIG. 1.
Figure 3:
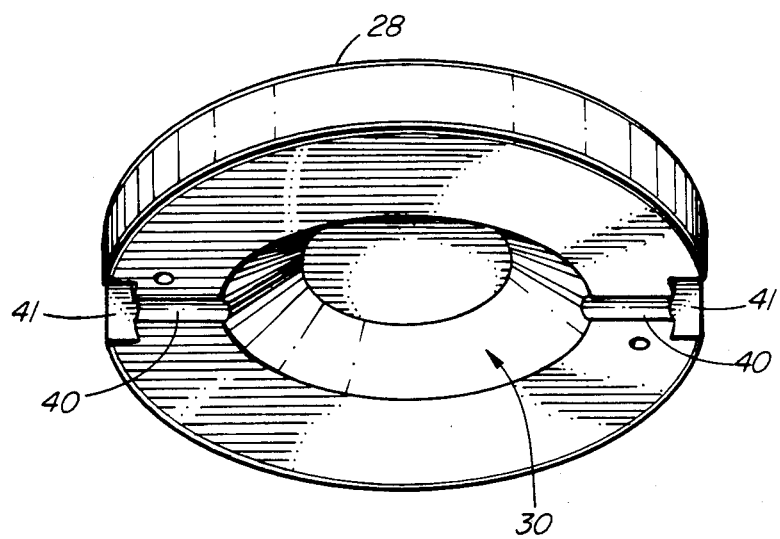
FIG. 3 is a bottom perspective view of the upper diaphragm of FIG. 2.

The transducer of the present invention includes, in the shown embodiment, an upper housing 10 of generally cylindric configuration and provided at its outer surface with cooling fins 11. The interior of the housing receives a plurality of printed circuit boards referred to only diagrammatically with reference numeral 12 in FIG. 1. The top of the housing 10 is provided with a cover 13 threadably received in the top of the housing and also provided with cooling fins 14. The lower part of the housing 10 is threadably secured to the top of a cylindric lower housing 15 by a threaded lower portion 16 provided with a centrally disposed cylindric passage 17, receiving a plurality of wires leading from the pressure sensing elements as will be described later and communicating same with the printed circuit boards 12. The lower part of the housing 15 has an outside thread 18 serving the purpose of sealingly securing the entire transducer to a vessel the pressure of which is to be monitored by the transducer. The threaded part 18, in turn, merges with an inwardly turned annular shoulder 19 (FIG. 2). At the interior of the lower housing 15, an inner thread 20 is complementary with the thread of the threaded lower portion 16 and also with the threaded part of a retainer 21 which is of a generally cylindric configuration and also has inside it a passage 22, having enlarged lower section 23, a first conical intermediate section 24 and of a relatively small-diameter cylindric section 25. The sections 23-25 of the passage 22 are coaxial with each other and with the cylindric passage 17 in the upper housing 10. The lower part of the spacer 21 is cylindrical and is freely slideable within a cylindric portion 26 of the lower part of the lower housing 15. At its lower extreme, the spacer 21 terminates by an annular, peripheral, downwardly directed lip 27 which presses upon a disc-shaped upper diaphragm 28, also referred to as a "second diaphragm". The second diaphragm 28 is located on top of a lower or first diaphragm 29. Both diaphragms 28 and 29 are of a circular disc-shaped configuration. Their outside diameter D is sufficiently smaller than the inside diameter of the cylindric portion 26 so that there is a free space for radial contraction of the threaded part of the body 18 due to installation allowed of both diaphragms 28, 29 without interference between their exterior cylindric surface with the inner cylindric portion 26. As best seen from FIG. 3, except for small cutouts in the upper diaphragm 28, the two diaphragms 28, 29 are of a generally identical size and configuration, each having a downwardly open central cavity. The corresponding parts are therefore designated with the same reference numbers. The cavity 30 of the second diaphragm 28 and of the first diaphragm 29 is designated with reference numeral 30. As seen from FIG. 2, each cavity 30 is conical and thus has the configuration of a trapezoid in cross-section. The cavity could also be cylindrical, whereby the cross-sectional configuration would be generally rectangular, if desired. The cavity 30 of the lower diaphragm 29 faces downwardly, i.e. into an opening 31 defined by the inwardly directed shoulder 19. The first diaphragm 29 rests with its downwardly directed peripheral surface portion on the inwardly turned interior surface of the shoulder 19. The peripheral surface portion is provided with an O-ring 32 for a sealed engagement between the first diaphragm 29 and the inwardly turned shoulder 19. The downwardly directed surface (also referred to as "outer surface portion") of the first diaphragm 28 is thus exposed to the pressurized medium in a chamber or the like, through the opening 31.

The corresponding cavity 30 of the second diaphragm 28 is filled in with a resilient rubber-like material which, in operation, behaves much like a highly viscose liquid. In the shown embodiment the layer of the resilient rubber-like material has hardness of less than 45° Shore. There are two centering pins, such as pin 32 holding the two diaphragms 28, 29 in a generally coaxial arrangement, with the resilient rubber-like material layer 33 disposed there between. The layer 33 is placed between the diaphragms 28, 29 by injection of a self-hardening substance. The inwardly directed surfaces of each of the diaphragms 28, 29, i.e. the surfaces facing upwards in FIGS. 1 or 2, are each provided with a strain gauge. The strain gauges are well known in the art. As described above, their physical structure is basically that of a foil adhesively secured to the surface of the respective diaphragm. Thus, the strain gauge 34 is adhesively secured to the top surface of the first diaphragm 29 while the strain gauge of the upper diaphragm 27 is designated with reference number 35.

As mentioned above, the strain gauges form a Wheatstone bridge as is well-known in the art. The strain gauges themselves, while utilized in the present invention are a purchased item the structural feature of which does not form a part of the present invention. It will suffice to say, with reference to FIG. 2, that there are two pairs of wires, 36, 37 providing electrical connection between the strain gauge 34 and the printed circuit boards 12 housed in the upper housing 10 of the device, while the second two pairs of wires 38, 39 communicate the signals generated at the strain gauge 35 to the printed circuit boards. As best seen from FIG. 3, the upper, second diaphragm 28 is provided, in its lower surface and in its outer periphery with suitable cutouts to accommodate the wires 36, 37. The wires 36, 37 first pass through the resilient layer 33 and then through radial grooves 40 in the lower face of the diaphragm 28, to reach the respective cutouts 41 provided in the peripheral section of the diaphragm 28. The grooves 40 also allow the injection of the rubber-like material 33 between the diaphragms 28, 29, into the cavity 30 of the upper diaphragm 28.

In operation, the transducer is mounted, by its threaded part 18, into the wall of a pressurized vessel or the like. The transducer is connected by suitable connectors, usually terminating at a connector port 42 but not shown in the drawings, to the desired control means, for instance to a remote control panel. If the pressure within the vessel is ambient below a predetermined minimum, there is no activity experienced by the two diaphragms. When the pressure within the vessel begins to raise, the first diaphragm 29 is deformed due to its exposure to the pressurized vessel through the opening 31. It should be noted that the deflection of the diaphragm 29 or 28 is small, usually about 0.005". The maximum deflection does not exceed about 25% of the thickness of the thin section of the respective diaphragm. The resilient layer 33, interposed by injection in the cavity of the second diaphragm 28, provides full support for the low-pressure sensing lower diaphragm 29. At the same time, the layer 33 does not interfere with the deflection of the flexing part (i.e. the part limited by diameter d of FIG. 1) of the lower diaphragm 29 so that the reading obtained at the strain gauge 34 is accurate throughout the entire flexing range of the first diaphragm 29. The nature of the resilient rubber-like material within the cavity 29 thus allows, on the one hand, a support between the two elements at the point of maximum deflection, while, on the other hand, it does not interfere with the accuracy of the flexing of the lower diaphragm 29. When the lower diaphragm 29 reaches its maximum deflection, the layer 33 becomes in effect entrapped or compressed in the upper diaphragm 28 due to the deflection of the flexing part of the lower diaphragm 29. Both diaphragms now begin to deflect in unison. Of course, the system is designed such that, at maximum deflection, either of the two diaphragms 28, 29 is overstressed under expected conditions of operation. The layer 33 thus provides a transmission element between the two diaphragms which, on the one hand, does not interfere with the initial low pressure measurements and, on the other hand, once the lower diaphragm 29 is flexed to its maximum, provides a thorough transmission of its further flexing to the second, high pressure diaphragm 28.

The system as described operates at its optimum when the difference in the values obtained at the strain gauges 34, 35 is linear with the variations in the pressure. According to the invention, this can be obtained if certain size tolerances of the diaphragms are adhered to. In general terms and referring to FIG. 1, the linear behavior of each of the two diaphragms 28, 29 was found to be secured if the outside diameter D of the respective diaphragm is approximately 2.75-3.75 times greater than the minor diameter d of the conical cavity 30, and if the overall thickness b of the respective diaphragm is 3-10 times, preferably 5 times the thickness a of the flexing portion thereof. In other words, the flexing portion has thickness a which is about 1/10 to ⅓, preferably 1/5 of the overall thickness b.

In the shown embodiment, the outside diameter of each diaphragm is 1.875", the diameter a of the flexing portion is ⅝". The overall thickness is 5/16". Both diaphragms 28, 29 have the same measurements and shape except for items 40, 41 which are not present in the lower diaphragm 29.

Those skilled in the art will readily appreciate that further modifications, departing to a greater or lesser degree from the embodiment described above can be made without departing from the scope of the present invention. Accordingly, I wish to embody within the scope of the patent granted hereon all such embodiments as reasonably and properly come within the scope of my contribution to the art.

What is claimed is:
1. A pressure transducer including, in combination:
    (a) a housing portion provided with an opening at an outer end thereof;
    (b) a circular, disc-shaped first diaphragm having a central, first flexing portion and mounted in said housing such that an outer face of the flexing portion is exposed through said opening;
    (c) the first flexing portion of said first diaphragm having an inner face provided with a first strain gauge;
    (d) a support plate member secured to said housing portion and adapted to support the first diaphragm to prevent overstressing thereof on extreme pressures;
    (e) first transducing means for transmitting a signal produced by the first strain gauge; and
    (f) a layer of resilient, rubber-like material sandwiched between the flexing portion of the first diaphragm and the support plate member for transmitting the flexure of the flexing portion of the first diaphragm, due to pressures at said opening, from said first diaphragm to said support plate member.
2. A pressure transducer as claimed in claim 1, wherein the first flexing portion forms a bottom wall of a circular cavity concentric with said opening.
3. A pressure transducer as claimed in claim 2, wherein the cavity has an inwardly convergent, frustoconical side wall, a major diameter end at the opening, and a minor diameter end at the said bottom wall, at an inward and axial spacing from said opening.
4. A pressure transducer as claimed in claim 2, wherein the overall thickness of the first diaphragm is about 3-10 times greater than the thickness of the flexing portion thereof.
5. A pressure transducer as claimed in claim 2, wherein the overall thickness of the first diaphragm is about 5 times greater than the thickness of the flexing portion thereof.
6. A pressure transducer as claimed in claim 1, wherein the outside diameter of the first diaphragm is about 2.75-3.75 times greater than the diameter of the flexing portion, whereby the stress variations at the first strain gauge are generally linearly related to pressure variations at said opening, as long as the deflection of the flexing portion is within about 25% of the thickness thereof.
7. A pressure transducer as claimed in claim 1, wherein said support plate is a circular, disc-shaped second diaphragm having a central second flexing portion and mounted in said housing such that an outer surface of the second flexing portion is turned toward the inner surface of the first flexing portion, the inner surface of the second flexing portion being provided with a second strain gauge, said transducer further comprising second transducing means for transmitting a signal produced by the second strain gauge.
8. A pressure transducer as claimed in claim 7, comprising a layer of a resilient rubber-like material filling the space between the first and second flexing portions for transmitting the flexure of the first flexing portion to the second flexing portion.
9. A pressure transducer as claimed in claim 8, wherein the second flexing portion forms a bottom wall of a second circular cavity concentric with said opening.
10. A pressure transducer as claimed in claim 9, wherein the second circular cavity has an inwardly convergent, frustoconical side wall, a major diameter end generally coplanar with the inner surface of the first flexing portion, and a minor diameter end at the bottom wall of the second circular cavity, at an inward spacing from said major diameter end.
11. A pressure transducer as claimed in claim 10, wherein the outside diameter of the second diaphragm is about 2.75-3.75 times greater than the diameter of the second flexing portion.
12. A pressure transducer as claimed in claim 9, wherein the overall thickness of the first and/or second diaphragm is about 3-10 times greater than the thickness of the said first and/or second flexing portion.
13. A pressure transducer as claimed in claim 9, wherein the overall thickness of the first and/or second diaphragm is about 5 times greater than the thickness of said first and/or second flexing portion.
14. A pressure transducer as claimed in claim 1, wherein said rubber-like material has the hardness of less than 45° Shore.
15. For use in a pressure transducer, a diaphragm set comprising, in configuration:
    (a) a disc-shaped first diaphragm member having a normally outer surface adapted to be exposed to a pressurized medium;
    (b) a strain gauge fixedly secured to a second surface of said first diaphragm member;
    (c) a disc-shaped second diaphragm member having a first surface turned to said second surface of the first diaphragm member;
    (d) a transition layer of a resilient rubber-like material sandwiched between the first and the second diaphragms;
    (e) a second strain gauge fixedly secured to said second diaphragm at a second surface thereof; and
    (f) transducer means for transmission of signals generated by said gauge strips.

16. A diaphragm set as claimed in claim 15, wherein said transition layer is disposed within a cavity provided in one of the two diaphragm members.

17. A diaphragm set as claimed in claim 16, wherein said cavity is in the first surface of the second diaphragm member.

18. A diaphragm set as claimed in claim 16, wherein the cavity is of a frustoconical configuration having a major diameter end in a general coincidence with a plane at which the second surface of the first diaphragm and the first surface of the second diaphragm member abut against each other thus enclosing said cavity with the transmission layer disposed therein.

19. A diaphragm set as claimed in claim 18 wherein said first diaphragm member is provided with a cavity at said normally outer surface thereof, said cavity being of the shape and size generally identical with that of the cavity in the second diaphragm member and being divergent in an axial direction away from the second diaphragm member, thus having a main diameter end and a major diameter.

20. A diaphragm set as claimed in claim 19, wherein the outside diameter of each diaphragm member is about 2.75–3.75 times greater than the minor diameter end of the cavity of the respective diaphragm member.

21. A diaphragm set as claimed in claim 19, wherein the bottom of the respective cavity defines a flexing portion of the respective diaphragm member, the overall thickness of the respective diaphragm member being about times that of the respective flexing portion.

22. A set as claimed in claim 19, wherein the bottom of the respective cavity defines a flexing portion of the respective diaphragm member, the overall thickness of the respective diaphragm member being about 5 times that of the respective flexing portion.

23. A set as claimed in claim 22, wherein the outside diameter of each diaphragm member is about 2.75–3.75 times greater than the minor diameter end of the cavity of the respective diaphragm member.

24. A diaphragm set as claimed in claim 15, wherein said diaphragm members are made of stainless steel and wherein said rubber-like material is of hardness of less than about 45° Shore.

* * * * *